US012613716B2

(12) United States Patent
Ma

(10) Patent No.: US 12,613,716 B2
(45) Date of Patent: Apr. 28, 2026

(54) CONTROL METHOD, ELECTRONIC DEVICE, AND NON-TRANSITORY READABLE STORAGE MEDIUM

(71) Applicant: VIVO MOBILE COMMUNICATION CO., LTD., Dongguan (CN)

(72) Inventor: Yi Ma, Hangzhou (CN)

(73) Assignee: VIVO MOBILE COMMUNICATION CO.,LTD., Dongguan (CN)

( * ) Notice: Subject to any disclaimer, the term of this patent is extended or adjusted under 35 U.S.C. 154(b) by 142 days.

(21) Appl. No.: 18/521,116

(22) Filed: Nov. 28, 2023

(65) Prior Publication Data

US 2024/0095049 A1      Mar. 21, 2024

Related U.S. Application Data

(63) Continuation of application No. PCT/CN2022/094451, filed on May 23, 2022.

(30) Foreign Application Priority Data

May 28, 2021    (CN) .......................... 202110594203.8

(51) Int. Cl.
*G06F 9/451* (2018.01)
*G06F 3/04817* (2022.01)
*G06F 3/0484* (2022.01)
*G06F 3/0488* (2022.01)
*G06F 3/16* (2006.01)

(52) U.S. Cl.
CPC .......... *G06F 9/451* (2018.02); *G06F 3/04817* (2013.01); *G06F 3/0484* (2013.01); *G06F 3/0488* (2013.01); *G06F 3/165* (2013.01)

(58) Field of Classification Search
CPC ..... G06F 3/04817; G06F 3/0484; G06F 9/451
See application file for complete search history.

(56) References Cited

U.S. PATENT DOCUMENTS

| 2010/0299183 | A1* | 11/2010 | Fujioka | .................. | G06Q 10/00 |
| | | | | | 705/14.4 |
| 2012/0089940 | A1 | 4/2012 | Jang et al. | | |
| 2014/0059599 | A1* | 2/2014 | Sirpal | ................ | H04N 21/4823 |
| | | | | | 725/37 |
| 2015/0154780 | A1* | 6/2015 | Kobayashi | .......... | H04W 68/005 |
| | | | | | 345/636 |
| 2018/0316939 | A1 | 11/2018 | Todd | | |
| 2021/0286510 | A1* | 9/2021 | Tyler | ..................... | G06F 3/0483 |

(Continued)

FOREIGN PATENT DOCUMENTS

| CN | 104869207 | A | 8/2015 |
| CN | 108319442 | A | 7/2018 |
| CN | 109683847 | A | 4/2019 |

(Continued)

*Primary Examiner* — Seth A Silverman
(74) *Attorney, Agent, or Firm* — The Webb Law Firm

(57) ABSTRACT

A control method includes displaying a first widget of a first application program, where the first widget is associated with target functions of at least two application programs; receiving a first input performed by a user on a target control of the first widget; and performing target processing corresponding to the target control on N application programs in response to the first input; where the N application programs include the first application program, and N is an integer greater than 1.

17 Claims, 10 Drawing Sheets

(56)          References Cited

U.S. PATENT DOCUMENTS

2023/0236708  A1      7/2023  Xiao

FOREIGN PATENT DOCUMENTS

| CN | 110531905 | A | 12/2019 |
|----|-----------|---|---------|
| CN | 111596845 | A | 8/2020 |
| CN | 111796746 | A | 10/2020 |
| CN | 111831190 | A | 10/2020 |
| CN | 111857510 | A | 10/2020 |
| CN | 112148174 | A | 12/2020 |
| CN | 112148176 | A | 12/2020 |
| CN | 112148181 | A | 12/2020 |
| CN | 112269505 | A | 1/2021 |
| CN | 112817555 | A | 5/2021 |
| CN | 113325980 | A | 8/2021 |
| EP | 4145259 | A1 | 3/2023 |
| WO | 2020242589 | A1 | 12/2020 |

* cited by examiner

204

205

Discover | Podcast | Me

Karaoke | Cloud Village

Music player application program A

Moments | Sing room | Message

Me

Music player application program B

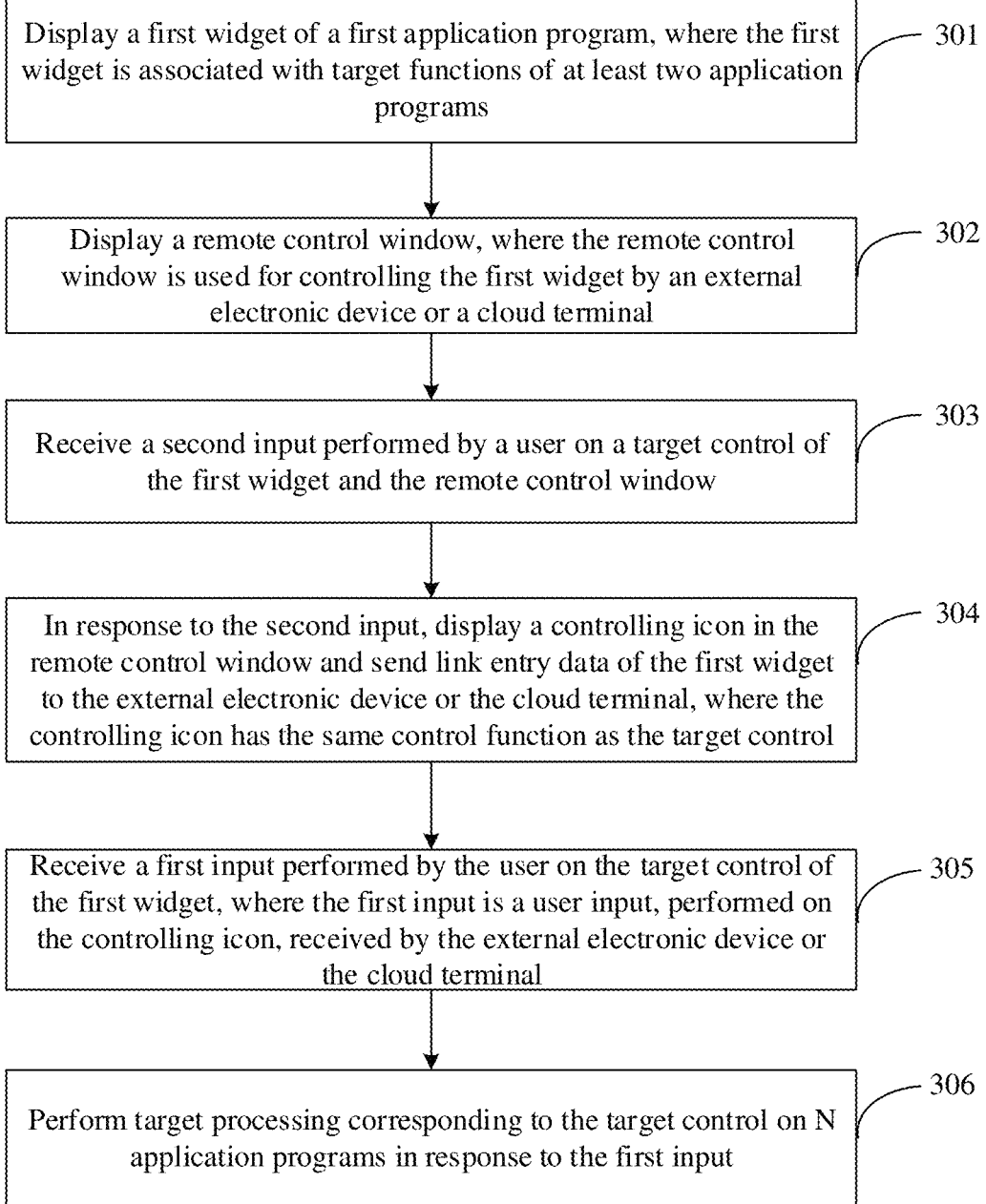

Display a first widget of a first application program, where the first widget is associated with target functions of at least two application programs — 301

Display a remote control window, where the remote control window is used for controlling the first widget by an external electronic device or a cloud terminal — 302

Receive a second input performed by a user on a target control of the first widget and the remote control window — 303

In response to the second input, display a controlling icon in the remote control window and send link entry data of the first widget to the external electronic device or the cloud terminal, where the controlling icon has the same control function as the target control — 304

Receive a first input performed by the user on the target control of the first widget, where the first input is a user input, performed on the controlling icon, received by the external electronic device or the cloud terminal — 305

Perform target processing corresponding to the target control on N application programs in response to the first input — 306

CONTROL METHOD, ELECTRONIC DEVICE, AND NON-TRANSITORY READABLE STORAGE MEDIUM

CROSS-REFERENCE TO RELATED APPLICATIONS

This application is a Bypass Continuation application of International Patent Application No. PCT/CN2022/094451 filed May 23, 2022, and claims priority to Chinese Patent Application No. 202110594203.8 filed May 28, 2021, the disclosures of which are hereby incorporated by reference in their entireties.

BACKGROUND OF THE INVENTION

Field of the Invention

This application pertains to the field of display technologies, and specifically relates to a control method, an electronic device, and a non-transitory readable storage medium.

Description of Related Art

In the prior art, functional components corresponding to application programs can be displayed separately on a screen of an electronic device. By performing a touch operation on a functional component, a user can control an application program corresponding to the functional component to perform an application program function corresponding to the functional component.

When users need to start the functions of two or more application programs, users have to find corresponding functional components of the application programs and perform touch operations on the functional components, respectively. In other words, when users need to start the functions of two or more application programs, users have to frequently switch between the application programs to find the corresponding functional components and frequently perform a touch operation on the functional components of the application programs. This is a cumbersome operation process.

SUMMARY OF THE INVENTION

According to a first aspect, an embodiment of this application provides a control method, where the method includes:

displaying a first widget of a first application program, where the first widget is associated with target functions of at least two application programs;

receiving a first input performed by a user on a target control of the first widget; and performing target processing corresponding to the target control on N application programs in response to the first input; where the N application programs include the first application program, and N is an integer greater than 1.

According to a second aspect, an embodiment of this application provides a control apparatus, where the apparatus includes:

a first display module configured to display a first widget of a first application program, where the first widget is associated with target functions of at least two application programs;

a first receiving module configured to receive a first input performed by a user on a target control of the first widget; and a first execution module configured to perform target processing corresponding to the target control on N application programs in response to the first input; where the N application programs include the first application program, and N is an integer greater than 1.

According to a third aspect, an embodiment of this application provides an electronic device, where the electronic device includes a processor, a memory, and a program or an instruction stored in the memory and executable on the processor, and when the program or the instruction is executed by the processor, the steps of the method according to the first aspect are implemented.

According to a fourth aspect, an embodiment of this application provides a non-transitory readable storage medium, where the non-transitory readable storage medium stores a program or an instruction, and when the program or the instruction is executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or an instruction so as to implement the method according to the first aspect.

According to a sixth aspect, a computer program product is provided, where the computer program product is stored in a non-transient storage medium, and the computer program product is executed by at least one processor to implement the steps of the method according to the first aspect.

BRIEF DESCRIPTION OF THE DRAWINGS

FIG. 3 is a flowchart of another control method according to an embodiment of this application;

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the data used in this way is interchangeable in appropriate circumstances such that the embodiments of this application can be implemented in other orders than the order illustrated or described herein. In addition, objects distinguished by "first", "second", and the like are generally of a same type, and the quantities of the objects are not limited. For example, there may be one or more first objects. In addition, "and/or" in the specification and claims represents at least one of connected objects, and the character "I" generally indicates that the associated objects have an "or" relationship.

The control method, control apparatus, and electronic device provided in the embodiments of this application are hereinafter described in detail by using specific embodiments and application scenarios thereof with reference to the accompanying drawings.

Figure 1:
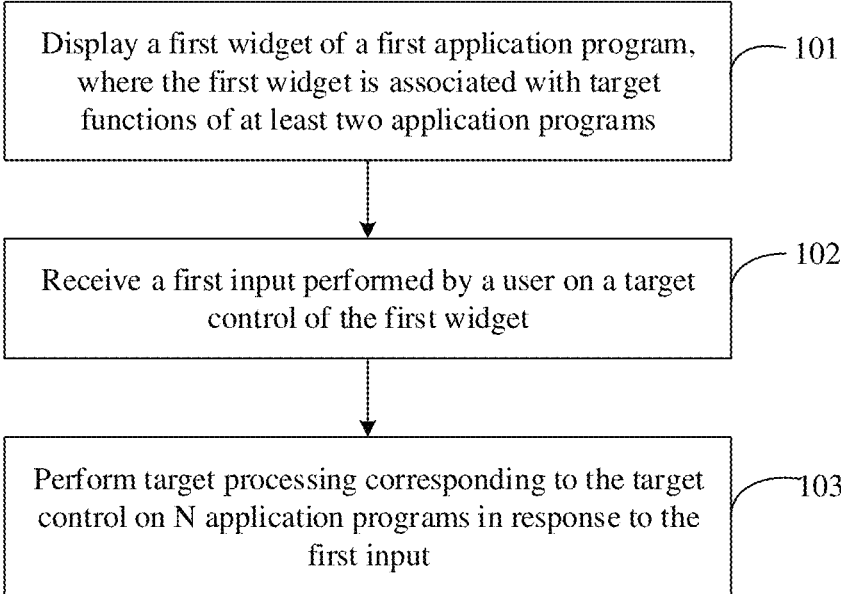
FIG. 1 is a flowchart of a control method according to an embodiment of this application.

Refer to FIG. 1. FIG. 1 is a flowchart of a control method according to an embodiment of this application. As shown in FIG. 1, the control method may include the following steps.

Step 101: Display a first widget of a first application program, where the first widget is associated with target functions of at least two application programs.

In specific implementation, the first widget may be understood as a collection of all components of the first application program. These components may include a functional component and a module component. The first widget may be displayed on a screen. For example, the functional component and module component of the first application program are extracted and the functional component and module component are displayed as atomic components on the screen. Thus, an application icon of the first application program may not be displayed on the screen, and instead, the functional component and module component of the first application program are displayed. The first widget may include the functional component of the first application program. In implementation, that the first widget is associated with target functions of at least two application programs may be understood as follows: one control of the first widget may be used for controlling the target functions of the at least two application programs.

Step 102: Receive a first input performed by a user on a target control of the first widget.

In specific implementation, the first input may be a touch input performed by a user on the target control, for example, tapping the target control or touching and holding the target control. Certainly, the first input may alternatively be a voice input performed on the target control. This is not specifically limited herein.

Step 103: Perform target processing corresponding to the target control on N application programs in response to the first input.

The N application programs include the first application program, and N is an integer greater than 1. It should be noted that the first widget provided in this embodiment of this application may include a functional component displayed as an atomic component. The atomic component has the same meaning as "atomic component" in the prior art. The functional component is a component generated by extracting the main function of the application, for example, play, previous/next, volume control, or another function of a music or video player. Certainly, in specific implementation, the atomic component of the application program may further include a module component. In other words, the first widget may further include a module component. The module component is a component generated by extracting a page or tab of the application program, for example, home page, shopping cart, my account, or another module of a shopping application program. In the prior art, in a case that a user touches an atomic component, only data of a module associated with the atomic component, a page associated with the atomic component, or a tab associated with the atomic component can be displayed.

Unlike the prior art, the functional component provided in this embodiment of this application may be associated with a target function of another application program in addition to functions possessed by functional components in the prior art. This allows a user to control the target functions of the at least two application programs by operating the functional component. For example, a target function of the first application program and a target function of the second application program can be performed simultaneously in response to the first input.

In an optional embodiment, before the receiving a first input performed by a user on a target control of the first widget, the method further includes:

displaying a second widget and control association window of a second application program, where the first widget includes a first control, the second widget includes a second control, and the first control is associated with the same program function as the second control;

receiving a third input performed by a user on the first control, the second control, and the control association window; and displaying a combined control in the control association window in response to the third input, where the combined control is associated with the first control and the second control; where the first input includes an input performed on the combined control, the N application programs include the first application program and the second application program, and the target control includes the first control and the second control; and the performing target processing corresponding to the target control on N application programs includes:

performing target processing corresponding to the first control on the first application program and performing target processing corresponding to the second control on the second application program.

In specific implementation, the first widget, the second widget, and the control association window may be displayed simultaneously on the screen. The third input may include one or more of touch inputs such as slide input and tap input. For example, the third input may include a first slide input and a second slide input, where a start position of a first slide trajectory is on the first control, an end position of the first slide trajectory is within the control association window, a start position of a second slide trajectory is on the second control, and an end position of the second slide trajectory is within the control association window. For another example, the third input includes a touch-and-hold input and a tap input, and in this case, a user may first touch and hold the control association window and then tap the first control and the second control.

Furthermore, the third input is used for generating the combined control within the control association window so that the combined control has the control functions of both the first control and the second control. In this way, in a case that a user operates the combined control, the control functions of the first control and the second control can be implemented simultaneously.

Figure 2A:
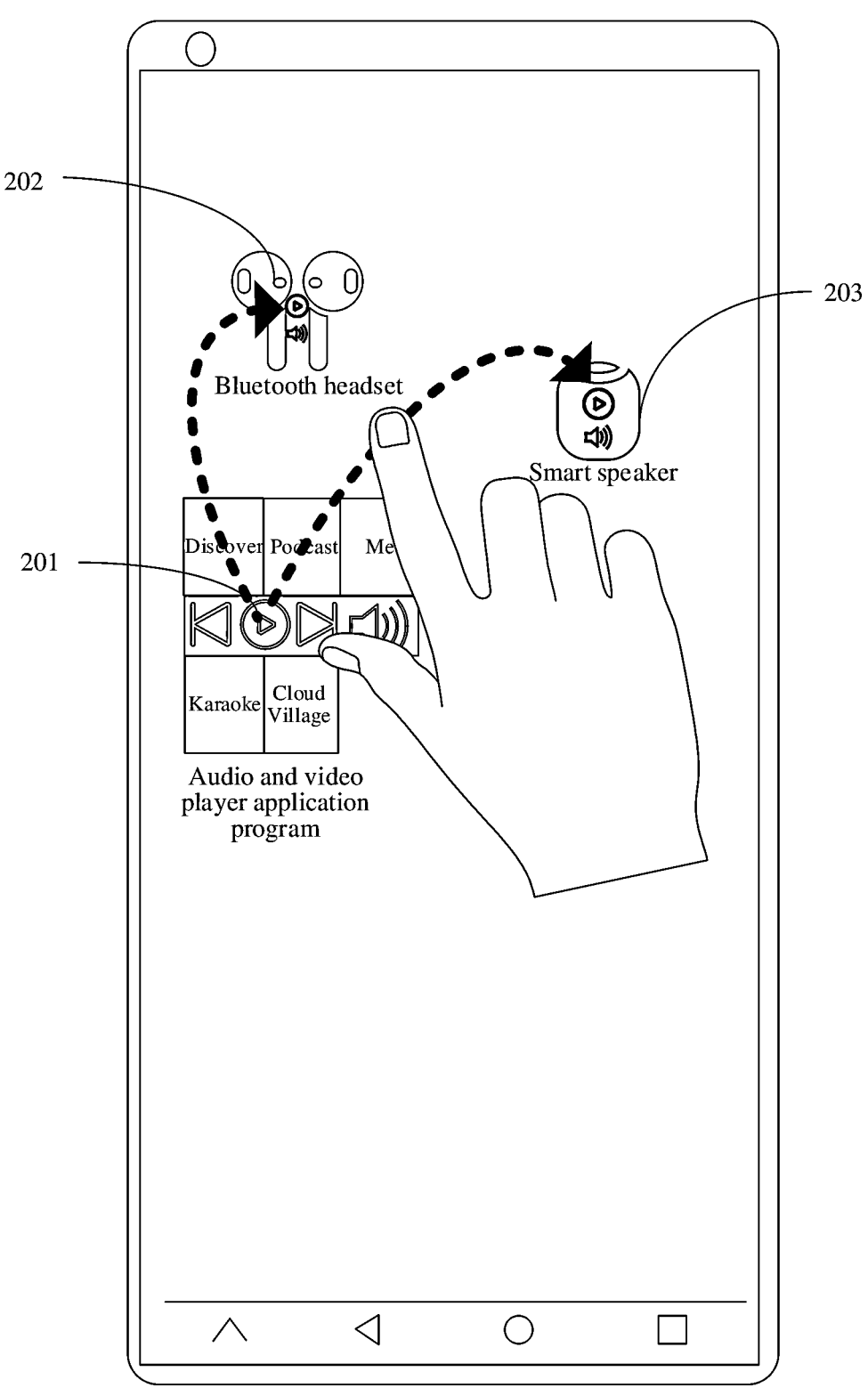
FIG. 2a is a first application scenario diagram of a control method according to an embodiment of this application.
Figure 2B:
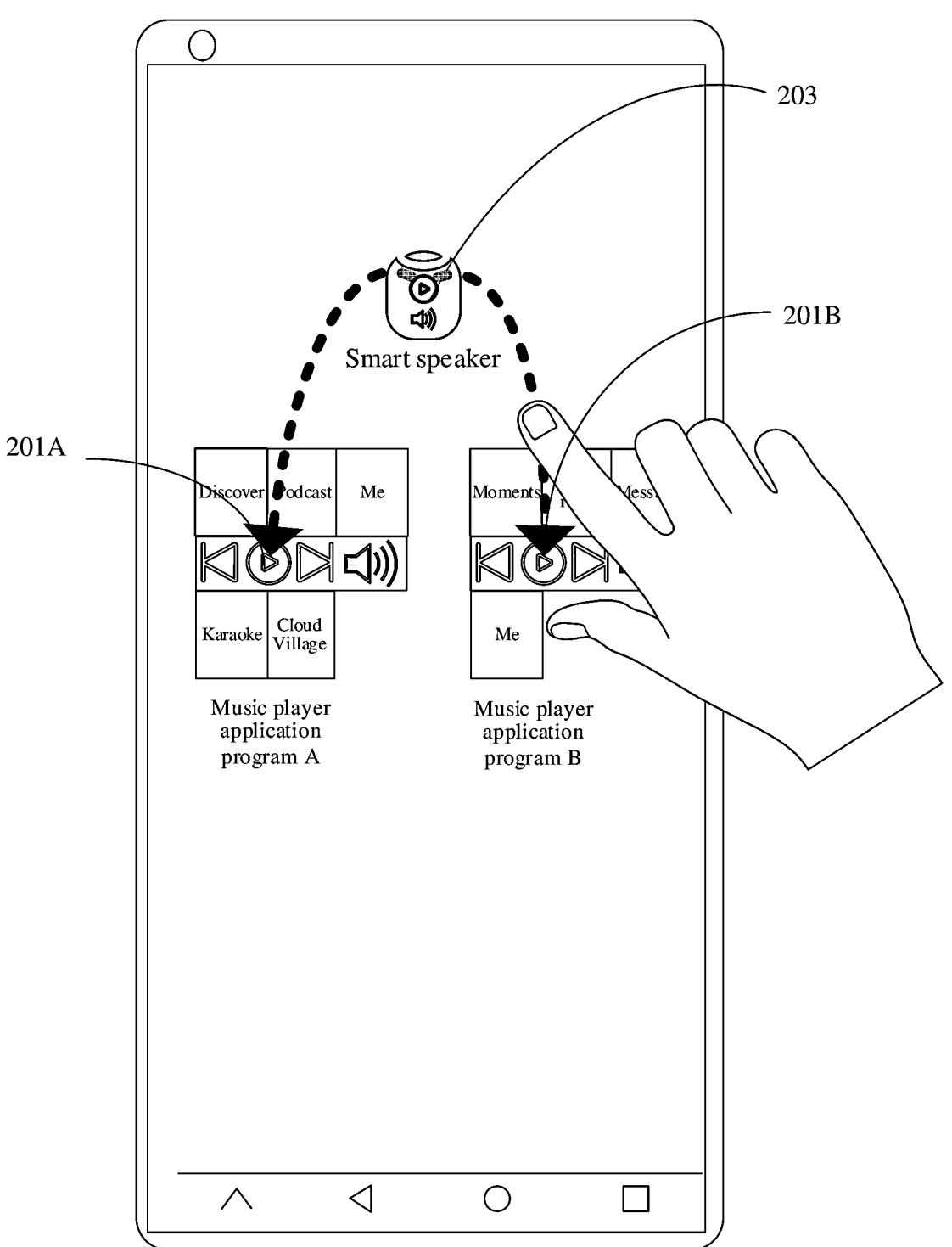
FIG. 2b is a second application scenario diagram of a control method according to an embodiment of this application.

Additionally, that the first control is associated with the same program function as the second control can be understood as follows: the first control and the second control are used for controlling a same function of different application programs. For example, as shown in FIG. 2d, a first control 204 is a volume control of a music player application program A, and a second control 205 is a volume control of a music player application program B. After a combined control 2061 is generated within a control association window 206 by performing the first slide input and the second slide input, if a user operates the combined control 2061 to adjust the volume, volume control is correspondingly performed on both the music player application program A and the music player application program B.

Certainly, in practical application, the combined control may further be associated with a third control of a third application program, and the number of controls associated with the combined control is not limited herein.

Additionally, in specific implementation, the control association window may be fixedly displayed on the screen or may be displayed under the trigger of a user input.

In this embodiment, with the third input performed on the first control, second control, and control association window, the combined control may be generated within the control association window. In this way, operating the combined control by a user is equivalent to operating both the first control and the second control, so that the first application program and the second application program are separately controlled to perform corresponding processing, so as to avoid the following case: in a case that a user needs to control the first application program and the second application program, a user has to locate the first control of the first application program to perform corresponding operation on the first control, and then switch to the second application program to perform corresponding operation on the second control. Therefore, in this embodiment, the process of controlling similar functions of at least two application programs can be simplified.

Further, after the displaying a combined control in the control association window, the method further includes:

receiving a fourth input performed by a user on the combined control;

displaying a first icon and a second icon in response to the fourth input, where the first icon is associated with the same program function as the first control, the second icon is associated with the same program function as the second control, the first icon is used for controlling the first application program, and the second icon is used for controlling the second application program;

in a case that a fifth input performed by a user on the first icon has been received, performing target processing corresponding to the first icon on the first application program in response to the fifth input; and in a case that a sixth input performed by a user on the second icon has been received, performing target processing corresponding to the second icon on the second application program in response to the sixth input.

In specific implementation, the fourth input may include at least one of touch inputs such as touch and hold and double tap on the combined control.

Additionally, the first icon may be understood as a control icon generated by copying the first control, and the first control icon is associated with the same program function as the first control. The second icon may be understood as a control icon generated by copying the second control, and the second control icon is associated with the same program function as the second control.

Figure 2C:
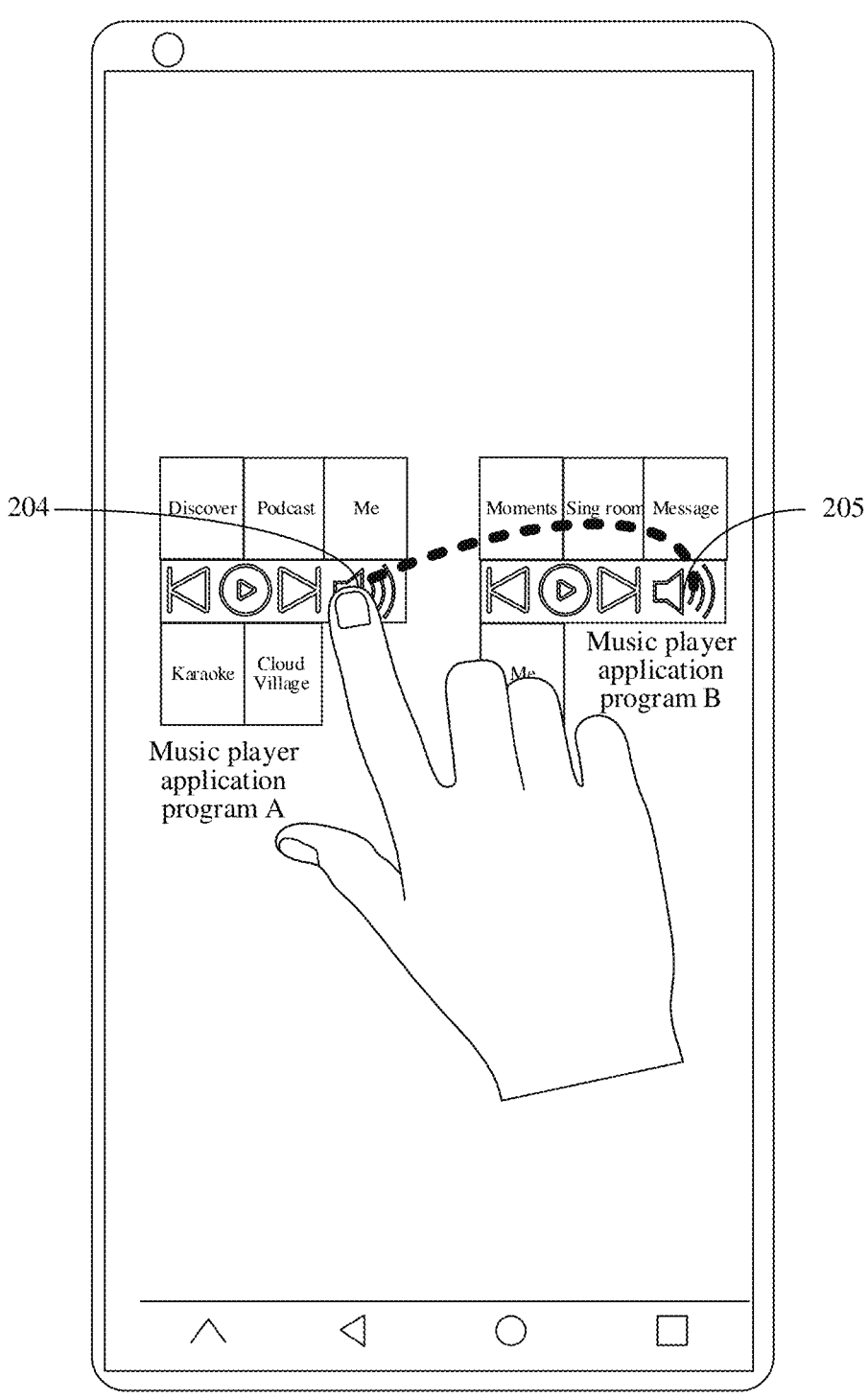
FIG. 2c is a third application scenario diagram of a control method according to an embodiment of this application.
Figure 2D:
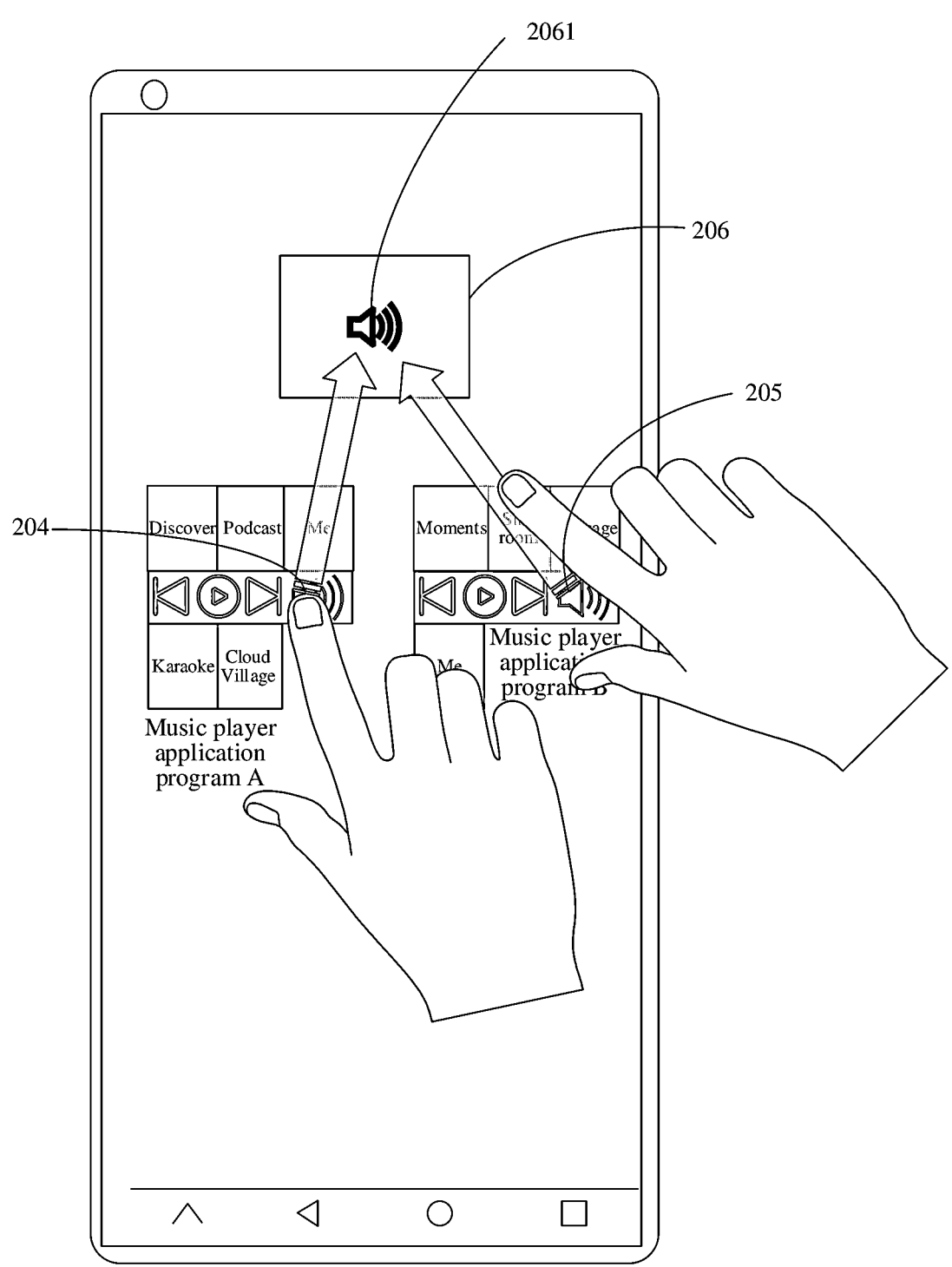
FIG. 2d is a fourth application scenario diagram of a control method according to an embodiment of this application.
Figure 2E:
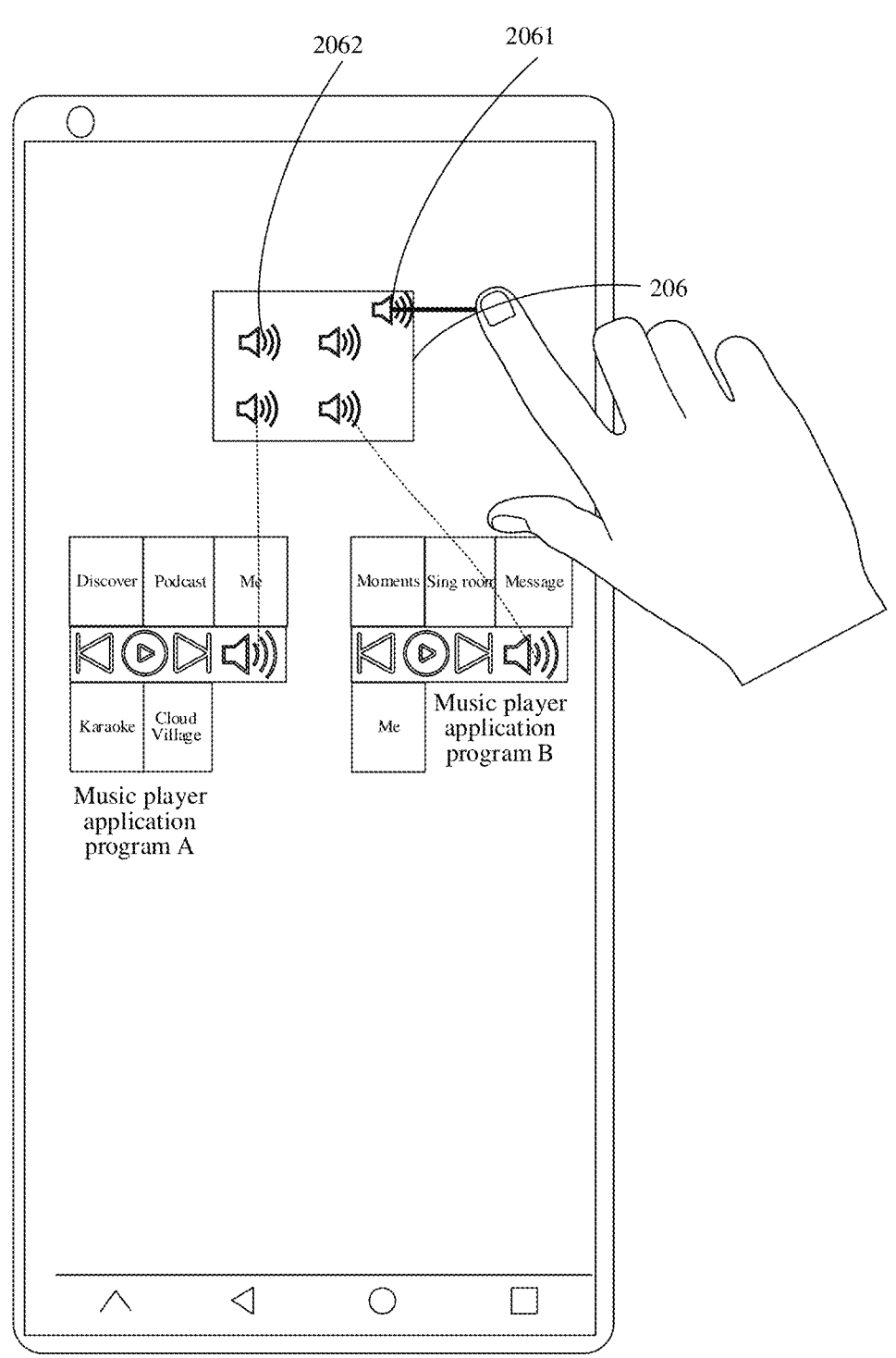
FIG. 2e is a fifth application scenario diagram of a control method according to an embodiment of this application.

For example, as shown in FIG. 2e, after the combined control 2061 is generated, if a user touches and holds the combined control 2061, control icons 2062 in a one-to-one correspondence with controls associated with the combined control 2061 can be displayed within the control association window 206. In this way, operating one of the control icons 2062 by a user is equivalent to operating a control corresponding to the control icon 2062, so as to control an application program corresponding to the control to perform corresponding processing.

In this embodiment, after the combined control is generated, with the fourth input performed on the combined control 2061, the control icons in a one-to-one correspondence with the controls associated with the combined control can be expanded. This allows a user to control merely one of the control icons, so as to implement target processing corresponding to the control icon merely on an application program corresponding to the control icon, thereby making control operation more target-specific.

In an optional embodiment, before the receiving a first input performed by a user on a target control of the first widget, the method further includes:

displaying a second widget of a second application program, where the first widget includes a third control, the second widget includes a fourth control, and the third control is associated with the same program function as the fourth control;

receiving a seventh input performed by a user on the third control and the fourth control; and associating the third control with the fourth control in response to the seventh input; where the N application programs include the first application program and the second application program, and the target control includes the third control and the fourth control; and the performing target processing corresponding to the target control on N application programs includes:

performing target processing corresponding to the third control on the first application program and performing target processing corresponding to the fourth control on the second application program.

In specific implementation, the seventh input may be a slide input between the third control and the fourth control or may further include respective tap inputs performed on the third control and the fourth control. This is not specifically limited herein.

Associating the third control with the fourth control has the same specific meaning and function as generating the combined control associated with the first control and the second control through the third input performed on the first control, second control, and control association window in the previous embodiment except that in this embodiment of this application, the control functions of the third control and the fourth control can be implemented simultaneously by performing the first input on either the third control or the fourth control without generating a control.

Additionally, the seventh input may be similar to the fourth input in the previous embodiment. For example, the seventh input may be a slide input from a display region of the third control to a display region of the fourth control or a slide input from a display region of the fourth control to a display region of the third control.

For example, as shown in FIG. 2c, if the third control is a volume adjustment control 204 of a music player application program A and the fourth control is a volume adjustment control 205 of a music player application program B, the seventh input may be a slide input starting from the volume adjustment control 204 and ending at the volume adjustment control 205.

Certainly, the seventh input may further include one or more of touch inputs such as touch and hold, force touch, double tap, and tap for the third control and/or fourth control. This is not specifically limited herein.

As compared with the embodiment in which the combined control associated with the first control and the second control is generated through the third input performed on the first control, second control, and control association window, in this embodiment, the third control can be associated with the fourth control while currently displayed content is kept unchanged, so that both the third control and the fourth control have the control functions of the third control and the fourth control. Therefore, a user can implement corresponding control on the first application program and a fourth application program by operating either the third control or the fourth control. This makes displayed content more concise and operation more convenient.

In an optional embodiment, the method further includes:

receiving an eighth input performed by a user on a second target control of the first widget, where the second target control is associated with a peripheral icon; and performing target processing corresponding to the second target control on an external hardware device in response to the eighth input, where the external hardware device is a hardware device indicated by the peripheral icon.

In specific implementation, the eighth input may be an input similar to the first input, and the second target control may also have a corresponding program function. In response to the eighth input, data of the program function associated with the second target control may be sent to the external hardware device so as to control the external hardware device to perform an application program function corresponding to the second target control. For example, as shown in FIG. 2a, the second target control is a play control 201 of a music player application program, and the play control 201 is associated with a Bluetooth headset icon 202 and a smart speaker icon 203. When a user touches the play control 201, audio play data of the music player application program may be sent to a Bluetooth headset and a smart speaker to start the Bluetooth headset icon 202 and the smart speaker icon 203, and an audio of the music player application program is played on both the Bluetooth headset icon 202 and the smart speaker icon 203.

In this embodiment, the second target control may be associated with the peripheral icon in advance, to make it convenient to control the external hardware device by the input performed on the second target control.

Further, before the receiving an eighth input performed by a user on a second target control of the first widget, the method further includes:

displaying the peripheral icon, where the peripheral icon indicates one external hardware device;

receiving a ninth input performed by a user on the second target control of the first widget and the peripheral icon; and associating the second target control with the peripheral icon in response to the ninth input.

In specific implementation, the peripheral icon of the external hardware device in communication connection with an electronic device may be displayed on the screen of the electronic device. In addition, the manner of associating the peripheral icon with the second target control may be similar to the manner of associating the third control with the fourth control through the seventh input in the previous embodiment. In other words, the ninth input may be similar to the seventh input in the previous embodiment and may have similar effects except that operation objects of the seventh input in the previous embodiment are the third control and the fourth control and that operation objects of the ninth input in this embodiment are the peripheral icon and the second target control. This is not detailed herein.

Additionally, there may be one or more peripheral icons. In the case of multiple peripheral icons, batch control over multiple external hardware devices can be implemented by performing an input on one second target control.

For example, as shown in FIG. 2a, the electronic device establishes a communication connection with both a Bluetooth headset and a smart speaker via Bluetooth, Wi-Fi, or the like. As such, a Bluetooth headset icon 202 corresponding to the Bluetooth headset and a smart speaker icon 203 corresponding to the smart speaker 203 can be displayed on the screen of the electronic device. In this case, a play control 201 of an audio and video player application program is slid to both the Bluetooth headset icon 202 and the smart speaker icon 203 to associate the play control 201 with both the Bluetooth headset icon 202 and the smart speaker icon 203. After the association, the Bluetooth headset and the smart speaker can be correspondingly controlled by operating the play control 201.

Certainly, in specific implementation, one peripheral icon may be associated with second target controls of different application programs. For example, as shown in FIG. 2b, a smart speaker icon 203 corresponding to a smart speaker is displayed on a screen of the electronic device, and a music player application program A and a music player application program B have been installed on the electronic device. In this case, through the ninth input, which is sliding from the smart speaker icon 203 to both a first play control 201A of the music player application program A and a second play control 201B of the music player application program B, the smart speaker icon 203 is associated with both the first play control 201A and the second play control 201B. In this way, when a user taps either the first play control 201A or the second play control 201B, the smart speaker can be started to play music.

In this embodiment, displaying the peripheral icon corresponding to the external hardware device makes it convenient for a user to perform the ninth input on the peripheral icon and the second target control so as to associate the peripheral icon with the second target control, thereby simplifying the operation process of associating the second target control with the external hardware device.

It should be noted that in practical application, a second target control may be copied N times to associate the N second target controls with N peripheral icons in a one-to-one correspondence. For example, a music player control may be copied twice to be associated with a Bluetooth speaker and a smart television, respectively. In this way, if a user operates a music player control associated with a Bluetooth speaker icon, only a Bluetooth speaker is controlled to play corresponding music. If a user operates a music player control associated with a smart television icon, only a smart television is controlled to play corresponding music. This makes control over the external device more target-specific.

Certainly, the ninth input may further include a touch and hold input performed on the second target control. A list of external hardware devices in communication connection may be displayed in response to the touch and hold input. In addition, the ninth input may further include a selection input performed on one or more external hardware devices in the list of external hardware devices, so as to associate a selected external hardware device with the second target control.

In the control method provided in this embodiment of this application, the first widget of the first application program is displayed, where the first widget is associated with the target functions of the at least two application programs; the first input performed by a user on the target control of the first widget is received; and target processing corresponding to the target control is performed on the N application programs in response to the first input; where the N application programs include the first application program, and N is an integer greater than 1. In this way, with the operation performed on the target control of the first widget, the target processing corresponding to the target control can be performed on the at least two application programs, thereby simplifying the operation process of separately controlling the at least two application programs.

Refer to FIG. 3. FIG. 3 is a flowchart of another control method according to an embodiment of this application. The another control method is similar to the control method in the method embodiment of FIG. 1 except that the first widget in the method embodiment of FIG. 3 can be shared with an external electronic device or a cloud terminal so that the external electronic device or the cloud terminal can remote-control the first widget to implement the first input. The control method embodiment of FIG. 3 can be applied to remote control application scenarios, which may specifically be an application scenario where an operation is performed on an electronic device so as to authorize another electronic device or cloud user to remote-control the electronic device to perform a specific function of an application program.

As shown in FIG. 3, the another control method provided in the method embodiment may include the following steps.

Step 301: Display a first widget of a first application program, where the first widget is associated with target functions of at least two application programs.

This step has the same meaning as step 101 in the method embodiment of FIG. 1 and therefore is not described in detail herein again.

Step 302: Display a remote control window, where the remote control window is used for controlling the first widget by an external electronic device or a cloud terminal.

Step 303: Receive a second input performed by a user on a target control of the first widget and the remote control window.

In specific implementation, the second input is used for sharing the target control of the first widget to an external electronic device or a cloud terminal and may include at least one of touch inputs such as slide, tap, and touch and hold. The second input is not limited to a specific form herein. For example, the second input may be a slide input from the target control to the remote control window. For another example, the second input may include tap inputs performed on the remote control window and the target control, respectively.

Certainly, the second input may alternatively be in other input forms. For example, a user may touch and hold the target control to display an operation option associated with the target control. The operation option associated with the target control includes at least a sharing option. When a user taps the sharing option, a contact list may be displayed. After a user selects a target contact from the contact list, the target control may be shared with an electronic device of the target contact. In this way, the electronic device of the target contact can receive and display a control icon corresponding to the target control (for example, the target control is displayed in an associated window of the electronic device of the target contact). This is not specifically limited herein.

Step 304: In response to the second, display a controlling icon in the remote control window input and send link entry data of the first widget to the external electronic device or the cloud terminal, where the controlling icon has the same control function as the target control.

Step 305: Receive a first input performed by a user on the target control of the first widget, where the first input is a user input, performed on the controlling icon, received by the external electronic device or the cloud terminal.

This step is similar to step 102 in the method embodiment of FIG. 1 except that the first input in this embodiment is a user input, performed on the controlling icon, received by the external electronic device or the cloud terminal, and therefore is not detailed herein again.

Step 306: Perform target processing corresponding to the target control on N application programs in response to the first input, where the N application programs include the first application program, and N is an integer greater than 1.

This step has the same meaning as step 103 in the method embodiment of FIG. 1 and therefore is not described in detail herein again.

In an embodiment, in a case that the external electronic device has received the link entry data of the first widget, the first widget may be displayed on the external electronic device, and a communication connection may be established between the external electronic device and a local device of the first widget based on the link entry data of the first widget. In this way, in a case that the external electronic device has received the first input performed on the target control of the first widget, corresponding operation information can be sent to the local device based on the link entry data of the first widget, enabling the local device to respond to the first input based on the operation information received.

In this embodiment, an application program function corresponding to the target control on the local device can be remote-controlled by the external electronic device, and the external electronic device is not granted with the permission to remote-control another application program function of the local device.

In another embodiment, after the link entry data of the first widget is sent to the cloud, a cloud server may receive remote operation requests by all users registered with the cloud server for the first widget. Then, based on a target user address (that is, an address of the electronic device of the first widget), the remote operation request is sent to the electronic device so that the electronic device performs a response process corresponding to the remote operation request.

Figure 4:
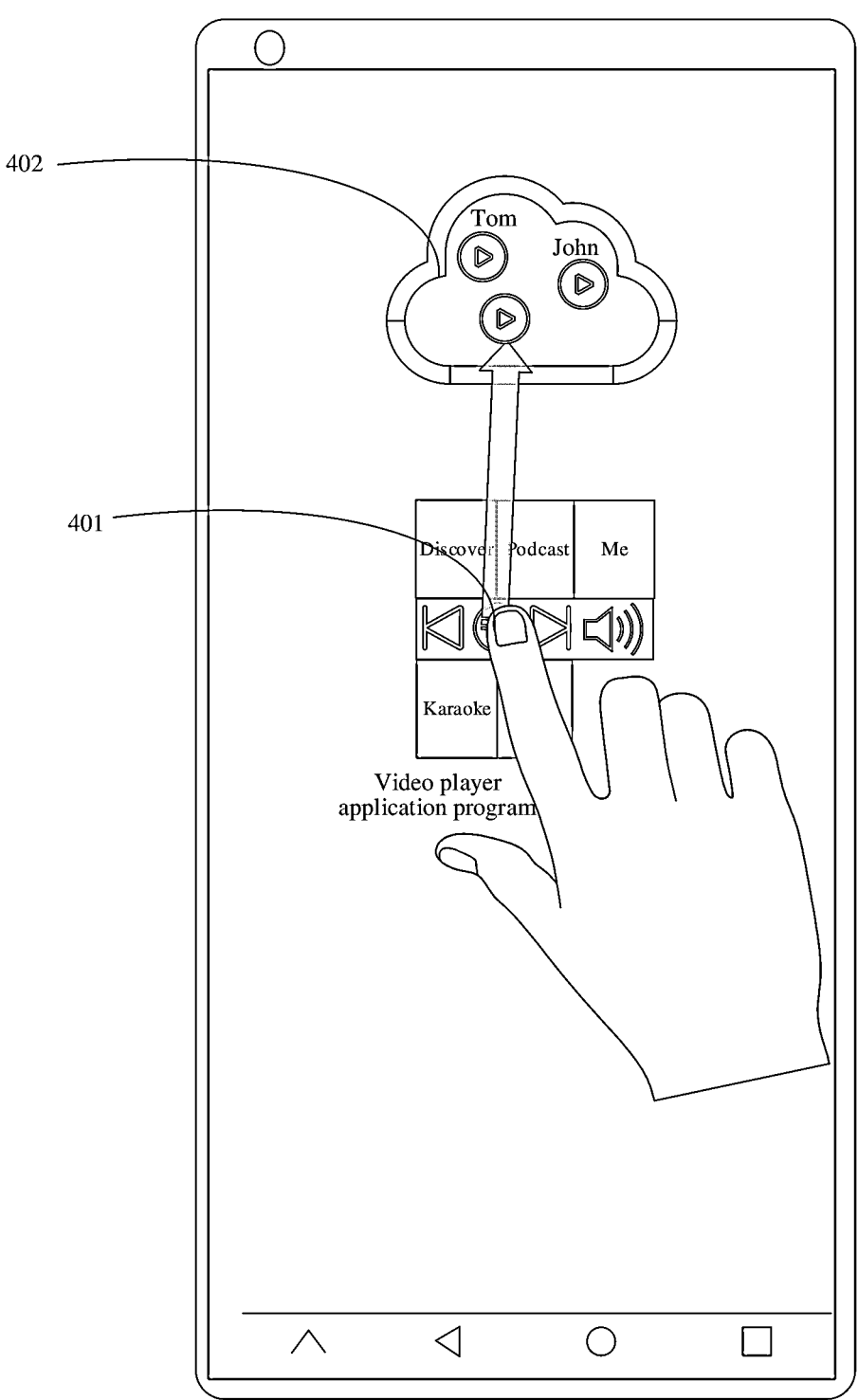
FIG. 4 is an application scenario diagram of another control method according to an embodiment of this application.

For example, a user of a first electronic device may send a video player atomic component of a video player application program to the cloud, so as to add the video player atomic component to a control group and allow another person to control the local device to play pushed video content. As shown in FIG. 4, a user of the electronic device may drag a video player control 401 into a remote control window 402 corresponding to a cloud component, so as to add the video player control 401 to the remote control window 402 and allow all users registered with a cloud component server to view and operate the video player control 401, so that other cloud users are authorized to control the video play function of the local device.

As compared with an external electronic device remote-controlling the local device, in this embodiment, remote control can be performed between two electronic devices without a direct communication connection, and two electronic devices intended to perform the remote control and response processes do not need to be in the same local area network or do not need to both be in a connected state. For example, in a case that a remote control party has a poor network connection, an operation for the first widget shared with the cloud may be buffered at the local device and sent to the local device through a cloud server when the network connection is good.

In implementation, the local device may choose to receive, from the external electronic device or the cloud terminal, a control command for the target control of the first widget in real-time and perform corresponding response processes like calculation and display at the local device. Certainly, the local device may alternatively choose to receive, from the external electronic device or the cloud terminal, a control command for the target control of the first widget at a later time. In other words, there may be a lag between the time when the external electronic device or the cloud terminal receives the first input or the cloud terminal and the time when the local device receives the control command, to improve the experience in a case that a user has no or poor network connection or other cases that require a lag.

In addition to the same beneficial effects as the method embodiment of FIG. 1, the following is made in this embodiment of this application: one or some specific functional components can be shared with an external electronic device or cloud user to grant the external electronic device or cloud user with permissions of a smaller granularity to operate their mobile phone. In other words, the external electronic device or cloud user is allowed only to remote-control an application program function corresponding to the functional component shared and not allowed to operate another application program function on the mobile phone of a user. Therefore, the authorization scope is finer. In addition, the manner of sharing an atomic component to authorize another user to operate the local device is different from live streaming in the prior art. Because in this embodiment of this application, operations for the functional component shared with the external electronic device or cloud user are all mapped to the local device, so that computation, display, and other response processes of an application program function corresponding to the operation are performed by the local device without occupying a large amount of bandwidth resources.

It should be noted that the control method provided in this embodiment of this application may be performed by a control apparatus or a control module for performing the control method in the control apparatus. In the embodiments of this application, the control apparatus provided in the embodiments of this application is described by using an example in which a control apparatus performs the control method.

Figure 5:
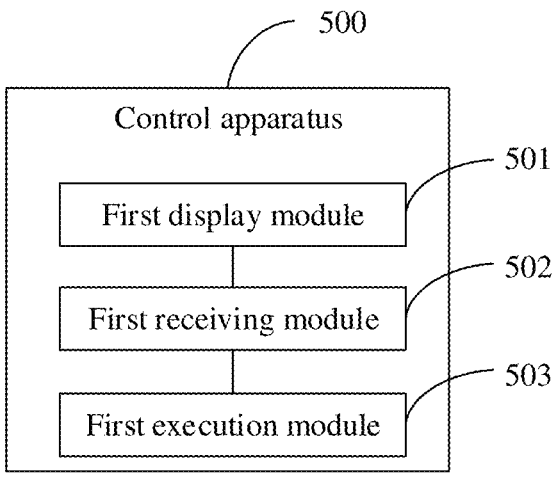
FIG. 5 is a structural diagram of a control apparatus according to an embodiment of this application.

Refer to FIG. 5. FIG. 5 is a structural diagram of a control apparatus according to an embodiment of this application. As shown in FIG. 5, the control apparatus 500 may include:

a first display module 501 configured to display a first widget of a first application program, where the first widget is associated with target functions of at least two application programs;

a first receiving module 502 configured to receive a first input performed by a user on a target control of the first widget; and a first execution module 503 configured to perform target processing corresponding to the target control on N application programs in response to the first input; where the N application programs include the first application program, and N is an integer greater than 1.

Optionally, the control apparatus 500 further includes:

a second display module configured to display a remote control window, where the remote control window is used for controlling the first widget by an external electronic device or a cloud terminal;

a second receiving module configured to receive a second input performed by a user on the target control of the first widget and the remote control window; and the second display module further configured to: in response to the second input, display a controlling icon in the remote control window; and a sending module configured to send link entry data of the first widget to the external electronic device or the cloud terminal, where the controlling icon has the same control function as the target control; where the first input is a user input, performed on the controlling icon, received by the external electronic device or the cloud terminal.

Optionally, the control apparatus 500 further includes:

a third display module configured to display a second widget and control association window of a second application program, where the first widget includes a first control, the second widget includes a second control, and the first control is associated with the same program function as the second control;

a third receiving module configured to receive a third input performed by a user on the first control, the second control, and the control association window; and the third display module further configured to display a combined control in the control association window in response to the third input, where the combined control is associated with the first control and the second control; where the first input includes an input performed on the combined control, the N application programs include the first application program and the second application program, and the target control includes the first control and the second control; and the first execution module 503 is specifically configured to:

perform target processing corresponding to the first control on the first application program and perform target processing corresponding to the second control on the second application program.

Optionally, the control apparatus 500 further includes:

a fourth receiving module configured to receive a fourth input performed by a user on the combined control;

a fourth display module configured to display a first icon and a second icon in response to the fourth input, where the first icon is associated with the same program function as the first control, the second icon is associated with the same program function as the second control, the first icon is used for controlling the first application program, and the second icon is used for controlling the second application program;

a second execution module configured to: in a case that a fifth input performed by a user on the first icon has been received, perform target processing corresponding to the first icon on the first application program in response to the fifth input; and a third execution module configured to: in a case that a sixth input performed by a user on the second icon has been received, perform target processing corresponding to the second icon on the second application program in response to the sixth input.

Optionally, the control apparatus 500 further includes:

a third display module configured to display a second widget of a second application program, where the first widget includes a third control, the second widget includes a fourth control, and the third control is associated with the same program function as the fourth control;

a fifth receiving module configured to receive a seventh input performed by a user on the third control and the fourth control; and a first association module configured to associate the third control with the fourth control in response to the seventh input; where the N application programs include the first application program and the second application program, and the target control includes the third control and the fourth control; and the first execution module 503 is specifically configured to:

perform target processing corresponding to the third control on the first application program and perform target processing corresponding to the fourth control on the second application program.

Optionally, the control apparatus 500 further includes:

a sixth receiving module configured to receive an eighth input performed by a user on a second target control of the first widget, where the second target control is associated with a peripheral icon; and a third execution module configured to perform target processing corresponding to the second target control on an external hardware device in response to the eighth input, where the external hardware device is a hardware device indicated by the peripheral icon.

Optionally, the control apparatus 500 further includes:

a fourth display module configured to display the peripheral icon, where the peripheral icon indicates one external hardware device;

a seventh receiving module configured to receive a ninth input performed by a user on the second target control of the first widget and the peripheral icon; and a second association module configured to associate the second target control with the peripheral icon in response to the ninth input.

The control apparatus 500 provided in this embodiment of this application can implement the processes of the method embodiment of FIG. 1 or 3, with the same technical effects achieved. To avoid repetition, details are not described herein again.

The control apparatus in this embodiment of this application may be an apparatus or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The control apparatus in this embodiment of this application may be an apparatus with an operating system. The operating system may be an android operating system, iOS operating system, or other possible operating system. This is not specifically limited in the embodiments of this application.

The control apparatus provided in this embodiment of this application can implement the processes implemented in the method embodiment of FIG. 1 or 3. To avoid repetition, details are not described herein again.

Figure 6:
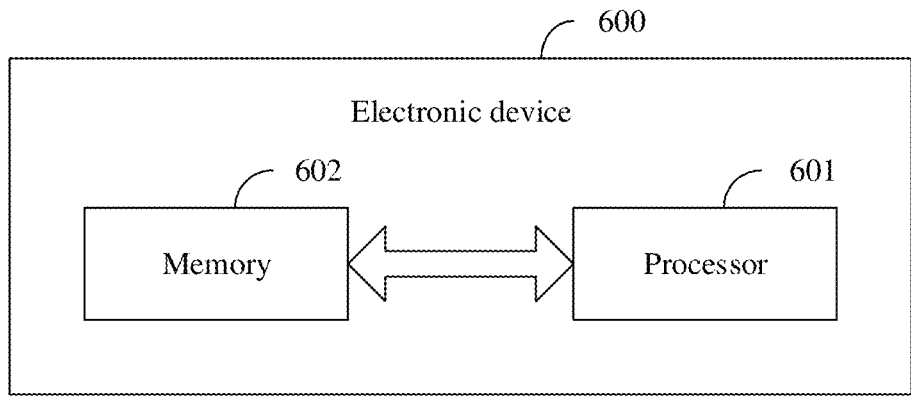
FIG. 6 is a structural diagram of an electronic device according to an embodiment of this application.

Optionally, as shown in FIG. 6, an embodiment of this application further provides an electronic device 600 including a processor 601, a memory 602, and a program or an instruction stored in the memory 602 and executable on the processor 601, where when the program or the instruction is executed by the processor 601, the processes of the control method embodiment of FIG. 1 or 3 are implemented, with the same technical effects achieved. To avoid repetition, details are not described herein again.

It should be noted that the electronic device in this embodiment of this application includes the foregoing mobile electronic device and non-mobile electronic device.

Figure 7:
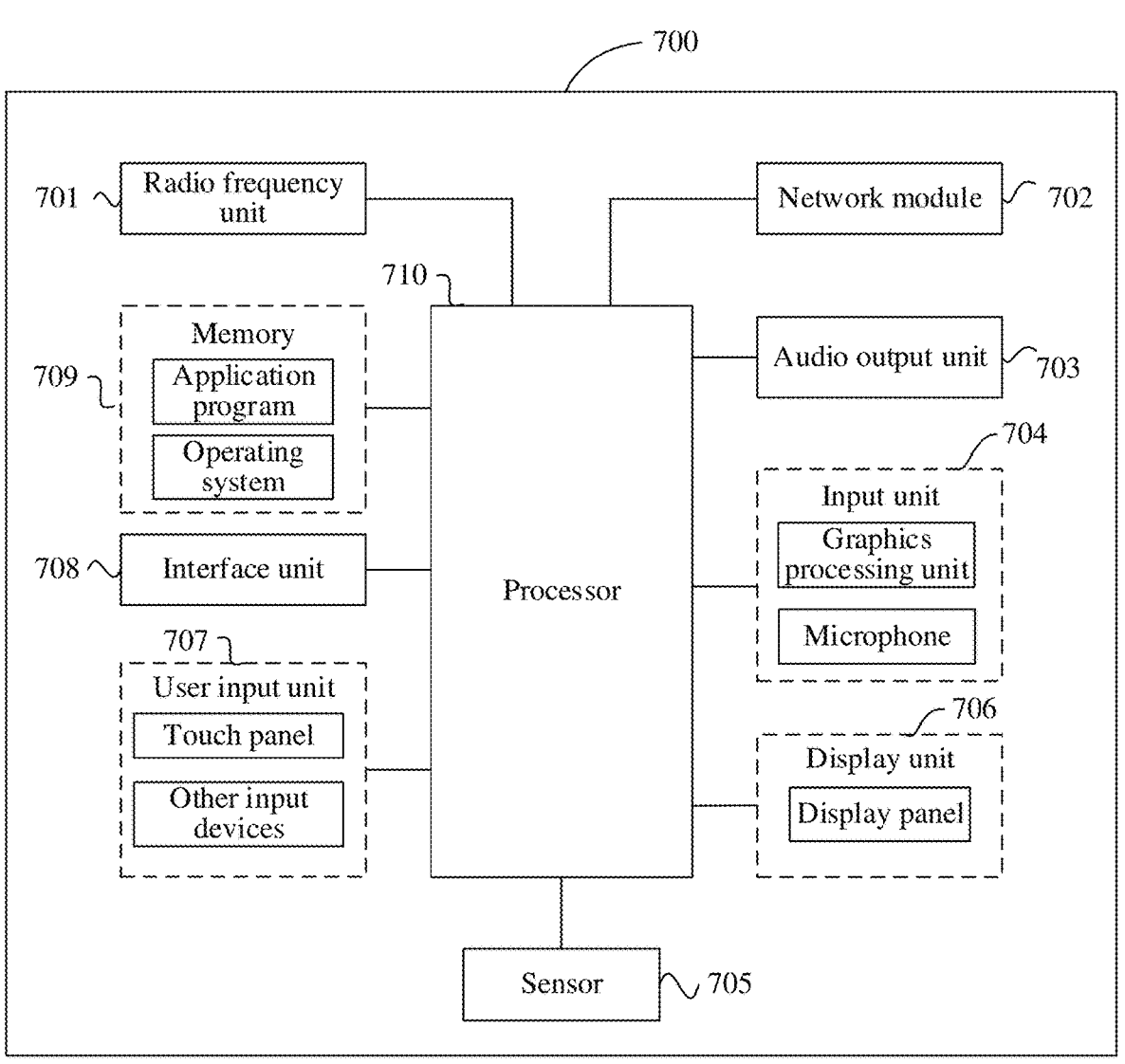
FIG. 7 is a structural diagram of another electronic device according to an embodiment of this application.

FIG. 7 is a schematic diagram of a hardware structure of an electronic device according to an embodiment of this application.

The electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

It can be understood by those skilled in the art that the electronic device 700 may further include a power supply (for example, a battery) supplying power to the components. The power supply may be logically connected to the processor 710 via a power management system so that functions such as charge management, discharge management, and power consumption management are implemented via the power management system. The structure of the electronic device shown in FIG. 7 does not constitute a limitation on the electronic device. The electronic device may include more or fewer components than shown in the drawing, or combine some of the components, or arrange the components differently. Details are not described herein.

The display module 706 is configured to display a first widget of a first application program, where the first widget is associated with target functions of at least two application programs;

the user input unit 707 or network module 702 is configured to receive a first input performed by a user on a target control of the first widget; and the processor 710 is configured to perform target processing corresponding to the target control on N application programs in response to the first input; where the N application programs include the first application program, and N is an integer greater than 1.

Optionally, before the user input unit 707 or network module 702 receives the first input performed by a user on the target control of the first widget:

the display module 706 is further configured to display a remote control window, where the remote control window is used for controlling the first widget by an external electronic device or a cloud terminal;

the user input unit 707 is further configured to receive a second input performed by a user on the target control of the first widget and the remote control window; and the display module 706 is further configured to display a controlling icon in the remote control window in response to the second input, and the network module 702 is further configured to send link entry data of the first widget to the external electronic device or the cloud terminal, where the controlling icon has the same control function as the target control; where the first input is a user input, performed on the controlling icon, received by the external electronic device or the cloud terminal.

Optionally, before the user input unit 707 or network module 702 receives the first input performed by a user on the target control of the first widget:

the display module 706 is further configured to display a second widget and control association window of a second application program, where the first widget includes a first control, the second widget includes a second control, and the first control is associated with the same program function as the second control;

the user input unit 707 is further configured to receive a third input performed by a user on the first control, the second control, and the control association window; and the display module 706 is further configured to display a combined control in the control association window in response to the third input, where the combined control is associated with the first control and the second control; where the first input includes an input performed on the combined control, the N application programs include the first application program and the second application program, and the target control includes the first control and the second control; and performing target processing corresponding to the target control by the processor 710 on the N application programs includes:

performing target processing corresponding to the first control on the first application program and performing target processing corresponding to the second control on the second application program.

Further, after the display module 706 displays the combined control in the control association window:

the user input unit 707 is further configured to receive a fourth input performed by a user on the combined control;

the display module 706 is further configured to display a first icon and a second icon in response to the fourth input, where the first icon is associated with the same program function as the first control, the second icon is associated with the same program function as the second control, the first icon is used for controlling the first application program, and the second icon is used for controlling the second application program;

the processor 701 is further configured to: in a case that the user input unit 707 has received a fifth input performed by a user on the first icon, perform target processing corresponding to the first icon on the first application program in response to the fifth input; and the processor 701 is further configured to: in a case that the user input unit 707 has received a sixth input performed by a user on the second icon, perform target processing corresponding to the second icon on the second application program in response to the sixth input.

Optionally, before the user input unit 707 or network module 702 receives the first input performed by a user on the target control of the first widget:

the display module 706 is further configured to display a second widget of a second application program, where the first widget includes a third control, the second widget includes a fourth control, and the third control is associated with the same program function as the fourth control;

the user input unit 707 is further configured to receive a seventh input performed by a user on the third control and the fourth control; and the processor 701 is further configured to associate the third control with the fourth control in response to the seventh input; where the N application programs include the first application program and the second application program, and the target control includes the third control and the fourth control; and performing target processing corresponding to the target control by the processor 710 on the N application programs includes:

performing target processing corresponding to the third control on the first application program and performing target processing corresponding to the fourth control on the second application program.

Optionally, the user input unit 707 is further configured to receive an eighth input performed by a user on a second target control of the first widget, where the second target control is associated with a peripheral icon; and the processor 701 is further configured to perform target processing corresponding to the second target control on an external hardware device in response to the eighth input, where the external hardware device is a hardware device indicated by the peripheral icon.

Optionally, before the user input unit 707 receives the eighth input performed by a user on the second target control of the first widget:

the display module 706 is further configured to display the peripheral icon, where the peripheral icon indicates one external hardware device;

the user input unit 707 is further configured to receive a ninth input performed by a user on the second target control of the first widget and the peripheral icon; and the processor 701 is further configured to associate the second target control with the peripheral icon in response to the ninth input.

The electronic device provided in this embodiment of this application can implement the processes of the method embodiment of FIG. 1 or 3, with the same technical effects achieved. To avoid repetition, details are not described herein again.

It should be understood that in this embodiment of this application, the input unit 704 may include a graphics processing unit (GPU) and a microphone. The graphics processing unit processes image data of a static picture or a video that is obtained by an image capture apparatus (for example, a camera) in a video capture mode or an image capture mode. The display unit 706 may include a display panel, and the display panel may be configured in a form of a liquid crystal display, an organic light-emitting diode, or the like. The user input unit 707 includes a touch panel and other input devices. The touch panel is also referred to as a touchscreen. The touch panel may include two parts: a touch detection apparatus and a touch controller. The other input devices may include but are not limited to a physical keyboard, a functional button (such as a volume control button or a power on/off button), a trackball, a mouse, and a joystick. Details are not described herein. The memory 709 may be configured to store software programs and various data including but not limited to application programs and operating systems. The processor 710 may integrate an application processor and a modem processor. The application processor mainly processes the operating system, a user interface, an application program, and the like. The modem processor mainly processes wireless communication. It can be understood that the modem processor may alternatively be not integrated into the processor 710.

An embodiment of this application further provides a non-transitory readable storage medium. The non-transitory readable storage medium stores a program or an instruction. The non-transitory storage medium may be volatile or non-volatile. When the program or the instruction is executed by a processor, the processes of the control method embodiment of FIG. 1 or 3 are implemented, with the same technical effects achieved. To avoid repetition, details are not described herein again.

The processor is the processor in the electronic device in the foregoing embodiments. The non-transitory readable storage medium includes a non-transitory computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or an instruction to implement the processes of the control method embodiment of FIG. 1 or 3, with the same technical effects achieved. To avoid repetition, details are not described herein again.

It should be understood that the chip mentioned in this embodiment of this application may also be referred to as a system-level chip, a system chip, a system on a chip or system-on-chip.

An embodiment of this application further provides a computer program product, where the computer program product is stored in a non-transient storage medium. When the computer program product is executed by at least one processor, the processes of the foregoing method embodiment of FIG. 1 or 3 are implemented, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is an example embodiment. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A control method, wherein the method comprises:

displaying a first widget of a first application program, wherein the first widget is associated with target functions of at least two application programs;

receiving a first input performed by a user on a target control of the first widget; and performing target processing corresponding to the target control on N application programs in response to the first input; wherein the N application programs comprise the first application program, and N is an integer greater than 1; wherein before the receiving a first input performed by a user on a target control of the first widget, the method further comprises:

displaying a second widget of a second application program, wherein the first widget comprises a third control, the second widget comprises a fourth control, and the third control and the fourth control are associated with a same program function;

receiving a seventh input performed by a user on the third control and the fourth control; and associating the third control with the fourth control in response to the seventh input; wherein the N application programs comprise the first application program and the second application program, and the target control comprises the third control and the fourth control; and the performing target processing corresponding to the target control on N application programs comprises:

performing target processing corresponding to the third control on the first application program and performing target processing corresponding to the fourth control on the second application program.

2. The method according to claim 1, wherein before the receiving a first input performed by a user on a target control of the first widget, the method further comprises:

displaying a remote control window, wherein the remote control window is used for controlling the first widget by an external electronic device or a cloud terminal;

receiving a second input performed by a user on the target control of the first widget and the remote control window; and in response to the second input, displaying a control icon in the remote control window and sending link entry data of the first widget to the external electronic device or the cloud terminal, wherein the control icon has the same control function as the target control; wherein the first input is a user input, performed on the control icon, received by the external electronic device or the cloud terminal.

3. The method according to claim 1, wherein before the receiving a first input performed by a user on a target control of the first widget, the method further comprises:

displaying a second widget and control association window of a second application program, wherein the first widget comprises a first control, the second widget comprises a second control, and the first control is associated with the same program function as the second control;

receiving a third input performed by a user on the first control, the second control, and the control association window; and displaying a combined control in the control association window in response to the third input, wherein the combined control is associated with the first control and the second control; wherein the first input comprises an input performed on the combined control, the N application programs comprise the first application program and the second application program, and the target control comprises the first control and the second control; and the performing target processing corresponding to the target control on N application programs comprises:

performing target processing corresponding to the first control on the first application program and performing target processing corresponding to the second control on the second application program.

4. The method according to claim 3, after the displaying a combined control in the control association window, further comprising:

receiving a fourth input performed by a user on the combined control;

displaying a first icon and a second icon in response to the fourth input, wherein the first icon is associated with the same program function as the first control, the second icon is associated with the same program function as the second control, the first icon is used for controlling the first application program, and the second icon is used for controlling the second application program;

in a case that a fifth input performed by a user on the first icon has been received, performing target processing corresponding to the first icon on the first application program in response to the fifth input; and in a case that a sixth input performed by a user on the second icon has been received, performing target processing corresponding to the second icon on the second application program in response to the sixth input.

5. The method according to claim 1, wherein the method further comprises:

receiving an eighth input performed by a user on a second target control of the first widget, wherein the second target control is associated with a peripheral icon; and performing target processing corresponding to the second target control on an external hardware device in response to the eighth input, wherein the external hardware device is a hardware device indicated by the peripheral icon.

6. The method according to claim 5, wherein before the receiving an eighth input performed by a user on a second target control of the first widget, the method further comprises:

displaying the peripheral icon, wherein the peripheral icon indicates one external hardware device;

receiving a ninth input performed by a user on the second target control of the first widget and the peripheral icon; and associating the second target control with the peripheral icon in response to the ninth input.

7. An electronic device, comprising a processor, a memory, and a program or an instruction stored in the memory and executable on the processor, wherein the program or the instruction, when executed by the processor, causes the electronic device to perform:

displaying a first widget of a first application program, wherein the first widget is associated with target functions of at least two application programs;

receiving a first input performed by a user on a target control of the first widget; and performing target processing corresponding to the target control on N application programs in response to the first input; wherein the N application programs comprise the first application program, and N is an integer greater than 1; wherein before the receiving a first input performed by a user on a target control of the first widget, the program or the instruction, when executed by the processor, causes the electronic device to further perform:

displaying a second widget of a second application program, wherein the first widget comprises a third control, the second widget comprises a fourth control, and the third control and the fourth control are associated with a same program function;

receiving a seventh input performed by a user on the third control and the fourth control; and associating the third control with the fourth control in response to the seventh input; wherein the N application programs comprise the first application program and the second application program, and the target control comprises the third control and the fourth control; and the performing target processing corresponding to the target control on N application programs comprises:

performing target processing corresponding to the third control on the first application program and performing target processing corresponding to the fourth control on the second application program.

8. The electronic device according to claim 7, wherein before the receiving a first input performed by a user on a target control of the first widget, the program or the instruction, when executed by the processor, causes the electronic device to further perform:

displaying a remote control window, wherein the remote control window is used for controlling the first widget by an external electronic device or a cloud terminal;

receiving a second input performed by a user on the target control of the first widget and the remote control window; and in response to the second input, displaying a control icon in the remote control window and sending link entry data of the first widget to the external electronic device or the cloud terminal, wherein the control icon has the same control function as the target control; wherein the first input is a user input, performed on the control icon, received by the external electronic device or the cloud terminal.

9. The electronic device according to claim 7, wherein before the receiving a first input performed by a user on a target control of the first widget, the program or the instruction, when executed by the processor, causes the electronic device to further perform:

displaying a second widget and control association window of a second application program, wherein the first widget comprises a first control, the second widget comprises a second control, and the first control is associated with the same program function as the second control;

receiving a third input performed by a user on the first control, the second control, and the control association window; and displaying a combined control in the control association window in response to the third input, wherein the combined control is associated with the first control and the second control;

wherein the first input comprises an input performed on the combined control, the N application programs comprise the first application program and the second application program, and the target control comprises the first control and the second control; and the performing target processing corresponding to the target control on N application programs comprises:

performing target processing corresponding to the first control on the first application program and performing target processing corresponding to the second control on the second application program.

10. The electronic device according to claim 9, wherein after the displaying a combined control in the control association window, the program or the instruction, when executed by the processor, causes the electronic device to further perform:

receiving a fourth input performed by a user on the combined control;

displaying a first icon and a second icon in response to the fourth input, wherein the first icon is associated with the same program function as the first control, the second icon is associated with the same program function as the second control, the first icon is used for controlling the first application program, and the second icon is used for controlling the second application program;

in a case that a fifth input performed by a user on the first icon has been received, performing target processing corresponding to the first icon on the first application program in response to the fifth input; and in a case that a sixth input performed by a user on the second icon has been received, performing target processing corresponding to the second icon on the second application program in response to the sixth input.

11. The electronic device according to claim 7, wherein the program or the instruction, when executed by the processor, causes the electronic device to further perform:

receiving an eighth input performed by a user on a second target control of the first widget, wherein the second target control is associated with a peripheral icon; and performing target processing corresponding to the second target control on an external hardware device in response to the eighth input, wherein the external hardware device is a hardware device indicated by the peripheral icon.

12. The electronic device according to claim 11, wherein before the receiving an eighth input performed by a user on a second target control of the first widget, the program or the instruction, when executed by the processor, causes the electronic device to further perform:

displaying the peripheral icon, wherein the peripheral icon indicates one external hardware device;

receiving a ninth input performed by a user on the second target control of the first widget and the peripheral icon; and associating the second target control with the peripheral icon in response to the ninth input.

13. A non-transitory readable storage medium, wherein the readable storage medium stores a program or an instruction, and the program or the instruction, when executed by a processor, causes the processor to perform:

displaying a first widget of a first application program, wherein the first widget is associated with target functions of at least two application programs;

receiving a first input performed by a user on a target control of the first widget; and performing target processing corresponding to the target control on N application programs in response to the first input; wherein the N application programs comprise the first application program, and N is an integer greater than 1; wherein before the receiving a first input performed by a user on a target control of the first widget, the program or the instruction, when executed by the processor, causes the processor to further perform:

displaying a second widget of a second application program, wherein the first widget comprises a third control, the second widget comprises a fourth control, and the third control and the fourth control are associated with a same program function;

receiving a seventh input performed by a user on the third control and the fourth control; and associating the third control with the fourth control in response to the seventh input; wherein the N application programs comprise the first application program and the second application program, and the target control comprises the third control and the fourth control; and the performing target processing corresponding to the target control on N application programs comprises:

performing target processing corresponding to the third control on the first application program and performing target processing corresponding to the fourth control on the second application program.

14. The non-transitory readable storage medium according to claim 13, wherein before the receiving a first input performed by a user on a target control of the first widget, the program or the instruction, when executed by the processor, causes the processor to further perform:

displaying a remote control window, wherein the remote control window is used for controlling the first widget by an external electronic device or a cloud terminal;

receiving a second input performed by a user on the target control of the first widget and the remote control window; and in response to the second input, displaying a control icon in the remote control window and sending link entry data of the first widget to the external electronic device or the cloud terminal, wherein the control icon has the same control function as the target control; wherein the first input is a user input, performed on the control icon, received by the external electronic device or the cloud terminal.

15. The non-transitory readable storage medium according to claim 13, wherein before the receiving a first input performed by a user on a target control of the first widget, the program or the instruction, when executed by the processor, causes the processor to further perform:

displaying a second widget and control association window of a second application program, wherein the first widget comprises a first control, the second widget comprises a second control, and the first control is associated with the same program function as the second control;

receiving a third input performed by a user on the first control, the second control, and the control association window; and displaying a combined control in the control association window in response to the third input, wherein the combined control is associated with the first control and the second control; wherein the first input comprises an input performed on the combined control, the N application programs comprise the first application program and the second application program, and the target control comprises the first control and the second control; and the performing target processing corresponding to the target control on N application programs comprises:

performing target processing corresponding to the first control on the first application program and performing target processing corresponding to the second control on the second application program.

16. The non-transitory readable storage medium according to claim 15, wherein after the displaying a combined control in the control association window, the program or the instruction, when executed by the processor, causes the electronic device to further perform:

receiving a fourth input performed by a user on the combined control;

displaying a first icon and a second icon in response to the fourth input, wherein the first icon is associated with the same program function as the first control, the second icon is associated with the same program function as the second control, the first icon is used for controlling the first application program, and the second icon is used for controlling the second application program;

in a case that a fifth input performed by a user on the first icon has been received, performing target processing corresponding to the first icon on the first application program in response to the fifth input; and in a case that a sixth input performed by a user on the second icon has been received, performing target processing corresponding to the second icon on the second application program in response to the sixth input.

17. The non-transitory readable storage medium according to claim 13, wherein the program or the instruction, when executed by the processor, causes the processor to further perform:

receiving an eighth input performed by a user on a second target control of the first widget, wherein the second target control is associated with a peripheral icon; and performing target processing corresponding to the second target control on an external hardware device in response to the eighth input, wherein the external hardware device is a hardware device indicated by the peripheral icon.

* * * * *